(12) United States Patent
Wang

(10) Patent No.: US 9,783,437 B2
(45) Date of Patent: Oct. 10, 2017

(54) OZONE FAUCET SWITCHING STRUCTURE

(71) Applicant: GEANN INDUSTRIAL CO., LTD., Chang Hua Hsien (TW)

(72) Inventor: Hsiang-Shih Wang, Changhua (TW)

(73) Assignee: Geann Industrial Co., Ltd., Chang Hua Hsien (TW)

( * ) Notice: Subject to any disclaimer, the term of this patent is extended or adjusted under 35 U.S.C. 154(b) by 659 days.

(21) Appl. No.: 14/299,049

(22) Filed: Jun. 9, 2014

(65) Prior Publication Data
US 2015/0353391 A1  Dec. 10, 2015

(51) Int. Cl.
*C02F 1/78* (2006.01)
*E03C 1/04* (2006.01)
*E03C 1/046* (2006.01)

(52) U.S. Cl.
CPC .................. *C02F 1/78* (2013.01); *E03C 1/04* (2013.01); *E03C 1/046* (2013.01); *C02F 2201/004* (2013.01); *C02F 2201/005* (2013.01); *C02F 2201/78* (2013.01); *C02F 2201/782* (2013.01); *C02F 2201/784* (2013.01); *C02F 2303/04* (2013.01); *C02F 2307/06* (2013.01); *E03C 2201/40* (2013.01)

(58) Field of Classification Search
CPC .. C02F 1/78; C02F 2201/78; C02F 2201/782; C02F 2303/04; C02F 2307/06; C02F 2201/004; C02F 2201/784; C02F 2201/005; C02F 1/685; E03C 1/046; E03C 1/04; E03C 2201/40; B01F 3/04099; B01F 2003/04886; B05B 1/00
See application file for complete search history.

(56) References Cited

U.S. PATENT DOCUMENTS 7,488,419 B1 * 2/2009 Wang ........................ C02F 1/78
                                                            210/198.1

* cited by examiner

*Primary Examiner* — Lucas Stelling
*Assistant Examiner* — Angel Olivera
(74) *Attorney, Agent, or Firm* — Alan D. Kamrath; Kamrath IP Lawfirm, P.A.

(57) ABSTRACT

An ozone faucet switching structure includes a faucet body, a connecting member connected with the faucet body, an aerator mounted in the connecting member, and a control sleeve mounted on the connecting member. The faucet body has a water outlet pipe which is provided with a conduit which is externally connected with an ozone device. Thus, the control sleeve is movable on the connecting member to stop supply of the ozone when not in use to prevent the ozone from being mixed with the drinking water.

7 Claims, 11 Drawing Sheets

OZONE FAUCET SWITCHING STRUCTURE

BACKGROUND OF THE INVENTION

1. Field of the Invention

The present invention relates to a faucet assembly and, more particularly, to an ozone faucet switching structure.

2. Description of the Related Art

A conventional ozone faucet structure 50 in accordance with the prior art shown in FIG. 11 comprises a faucet body 51 having a water outlet pipe 54, a handle 52 pivotally mounted on the faucet body 51, and a conduit 53 connected with the faucet body 51. The conduit 53 has a first end extended into the faucet body 51 and connected to the water outlet pipe 54 and a second end connected to an ozone arrangement. The handle 52 is operated to supply ozone from the ozone arrangement through the conduit 53 into the faucet body 51 so that the ozone is mixed with the water to achieve a sterilizing function. Thus, the ozone arrangement is started by operation of the handle 52 to supply ozone to the faucet body 51. However, when the ozone arrangement is not used, the user has to turn off the ozone arrangement or switch the ozone arrangement to stop supply of the ozone, thereby causing inconvenience to the user. In addition, when the ozone arrangement is turned off, a small amount of the ozone is still contained in the conduit 53 and is easily mixed with the drinking water, thereby causing a sanitary problem.

BRIEF SUMMARY OF THE INVENTION

In accordance with the present invention, there is provided an ozone faucet switching structure comprising a faucet body, a connecting member connected with the faucet body, an aerator mounted in the connecting member, and a control sleeve mounted on the connecting member. The faucet body has a water outlet pipe which is provided with a conduit which is externally connected with an ozone device. The connecting member has a first end provided with a fixing portion and a second end provided with a stop ring. The fixing portion of the connecting member is connected to the water outlet pipe of the faucet body and has an inner edge provided with at least one connecting hole connected to the conduit of the faucet body. The connecting member is provided with an upper channel and a lower channel. The upper channel of the connecting member is connected to the connecting hole. The connecting member is provided with an inwardly reduced ring located between the upper channel and the lower channel. The connecting member is provided with at least one pressure release hole which is located between the upper channel and the inwardly reduced ring. The connecting member has a periphery provided with an air hole connected to the pressure release hole. The connecting member has an outer surface provided with two annular grooves, and the ozone faucet switching structure further comprises two elastic rings mounted in the annular grooves of the connecting member. The aerator is mounted in the upper channel of the connecting member and has a top provided with a plurality of aerating holes connected to the water outlet pipe of the faucet body. The aerator has a side face provided with a plurality of side holes which form a connection of the connecting hole, the pressure release hole, the upper channel, the aerating holes and the lower channel. The control sleeve is provided with an inner annular face aligning with the annular grooves of the connecting member and pressing the elastic rings to form a movement resistance of the control sleeve. The control sleeve is provided with a first annular flange and a second annular flange, with the stop ring of the connecting member being limited between the first annular flange and the second annular flange of the control sleeve.

According to the primary advantage of the present invention, the control sleeve is movable on the connecting member to stop supply of the ozone when not in use to prevent the ozone from being mixed with the drinking water so that the drinking water is used safely.

According to another advantage of the present invention, the control sleeve is moved relative to the connecting member to switch supply of the ozone so that the user only needs to move the control sleeve to open or close supply of the ozone, thereby facilitating the user operating the ozone faucet switching structure.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
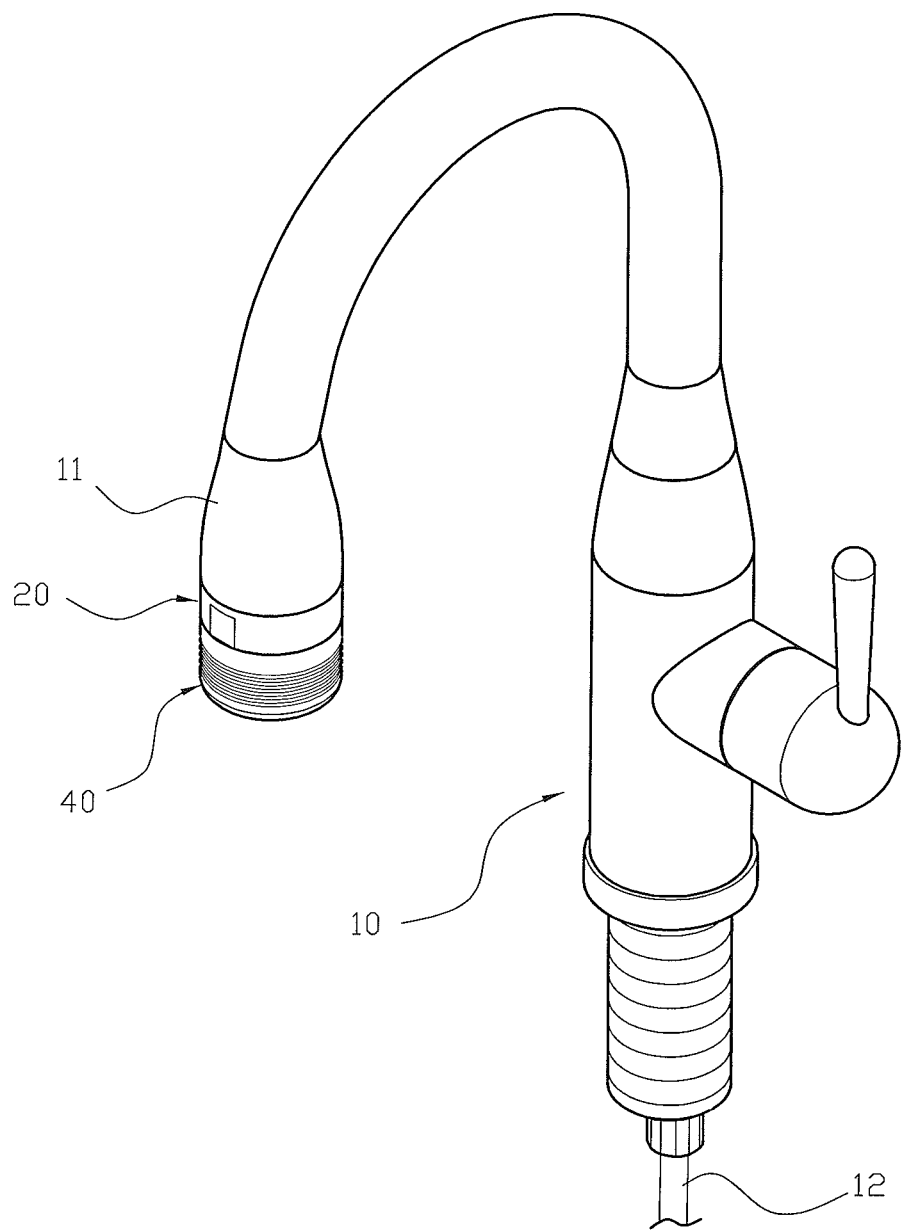
FIG. 1 is a perspective view of an ozone faucet switching structure in accordance with the preferred embodiment of the present invention.

Referring to the drawings and initially to FIGS. 1-6, an ozone faucet switching structure in accordance with the preferred embodiment of the present invention comprises a faucet body 10, a connecting member 20 connected with the faucet body 10, an aerator 30 mounted in the connecting member 20, and a control sleeve 40 mounted on the connecting member 20.

The faucet body 10 has a water outlet pipe 11 which is provided with a conduit 12 which is externally connected with an ozone device 13.

The connecting member 20 has a first end provided with a fixing portion 21 and a second end provided with a stop ring 22. The fixing portion 21 of the connecting member 20 is connected to the water outlet pipe 11 of the faucet body 10 and has an inner edge provided with at least one connecting hole 211 connected to the conduit 12 of the faucet body 10. The connecting member 20 is provided with an upper channel 23 and a lower channel 24. The upper channel 23 of the connecting member 20 is located between the lower channel 24 and the water outlet pipe 11 of the faucet body 10 and is connected to the connecting hole 211. The connecting member 20 is provided with an inwardly reduced ring 25 located between the upper channel 23 and the lower channel 24. The connecting member 20 is provided with at least one pressure release hole 251 which is located between the upper channel 23 and the inwardly reduced ring 25 and is extended toward the lower channel 24. The connecting member 20 has a periphery provided with an air hole 252 connected to the pressure release hole 251 to conduct the pressure release hole 251 to the ambient environment. The connecting member 20 has an outer surface provided with two annular grooves 26, and the ozone faucet switching structure further comprises two elastic rings 261 mounted in the annular grooves 26 of the connecting member 20. The annular grooves 26 of the connecting member 20 are adjacent to the air hole 252. The air hole 252 of the connecting member 20 is located between the elastic rings 261 and the stop ring 22. The stop ring 22 of the connecting member 20 is provided with at least one air vent portion 221 which introduces an ambient air to flow between the connecting member 20 and the control sleeve 40 into the pressure release hole 251. The ozone faucet switching structure further comprises a seal ring 27 mounted on the connecting member 20 and located between the air hole 252 and the stop ring 22.

The aerator 30 is mounted in the upper channel 23 of the connecting member 20 and has a top provided with a plurality of aerating holes 31 connected to the water outlet pipe 11 of the faucet body 10. The aerator 30 has a side face provided with a plurality of side holes 32 connected to the connecting hole 211 and the pressure release hole 251 form a connection of the connecting hole 211, the pressure release hole 251, the upper channel 23, the aerating holes 31 and the lower channel 24.

The control sleeve 40 is located outside of the connecting member 20 and is adjacent to the lower channel 24 of the connecting member 20. The control sleeve 40 is provided with an inner annular face 41 aligning with the annular grooves 26 of the connecting member 20 and pressing the elastic rings 261 to form a movement resistance of the control sleeve 40. The control sleeve 40 is provided with a first annular flange 42 and a second annular flange 43, with the stop ring 22 of the connecting member 20 being limited between the first annular flange 42 and the second annular flange 43 of the control sleeve 40. The control sleeve 40 is provided with an inner pressing face 44 pressing the seal ring 27 to form an air-tight effect between the connecting member 20 and the control sleeve 40. The inner pressing face 44 of the control sleeve 40 is located between the inner annular face 41 and the first annular flange 42.

The ozone faucet switching structure further comprises a check valve 14 mounted between the conduit 12 of the faucet body 10 and the connecting hole 211 of the connecting member 20 to form a oneway flow from the conduit 12 of the faucet body 10 to the connecting member 20. The check valve 14 includes a valve tube 141, a valve seat 143 connected with the valve tube 141, and a valve core 142 movably mounted in the valve tube 141. The valve tube 141 of the check valve 14 has a first end connected to the conduit 12 of the faucet body 10 and a second end connected to the valve seat 143. The valve seat 143 of the check valve 14 has an interior provided with a flow channel 144 connected to the valve tube 141 and the connecting hole 211 of the connecting member 20. The valve core 142 of the check valve 14 forms a oneway block to the flow channel 144 of the valve seat 143.

In assembly, the conduit 12 of the faucet body 10 is extended into the water outlet pipe 11, and the valve tube 141 of the check valve 14 is connected to the conduit 12 of the faucet body 10. Then, the aerator 30 is mounted in the upper channel 23 of the connecting member 20, with the inwardly reduced ring 25 of the connecting member 20 abutting the bottom of the aerator 30. At this time, the side holes 32 of the aerator 30 are connected to the connecting hole 211 and the pressure release hole 251 of the connecting member 20. Then, the fixing portion 21 of the connecting member 20 is mounted on and combined with the water outlet pipe 11 of the faucet body 10. At this time, the connecting hole 211 of the connecting member 20 is connected to the flow channel 144 of the valve seat 143 of the check valve 14, and the aerating holes 31 of the aerator 30 are connected to the water outlet pipe 11 of the faucet body 10. Then, the elastic rings 261 are mounted in the annular grooves 26 of the connecting member 20. Then, the control sleeve 40 is mounted on the connecting member 20, with the first annular flange 42 of the control sleeve 40 being squeezed to stride the stop ring 22 of the connecting member 20, so that the stop ring 22 of the connecting member 20 is limited between the first annular flange 42 and the second annular flange 43 of the control sleeve 40 to limit the movement distance of the control sleeve 40 on the connecting member 20. At this time, the inner annular face 41 of the control sleeve 40 presses the elastic rings 261.

Figure 2:
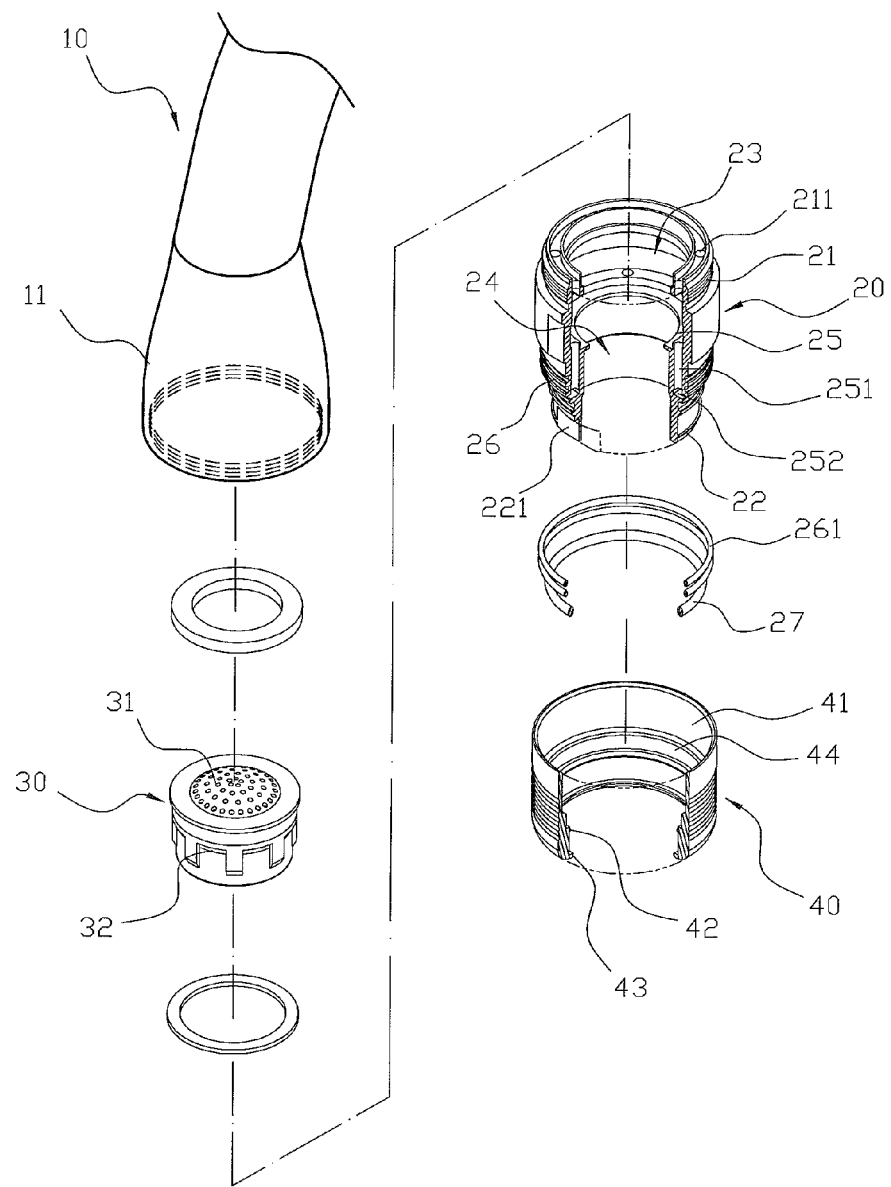
FIG. 2 is an exploded perspective view of the ozone faucet switching structure as shown in FIG. 1.
Figure 3:
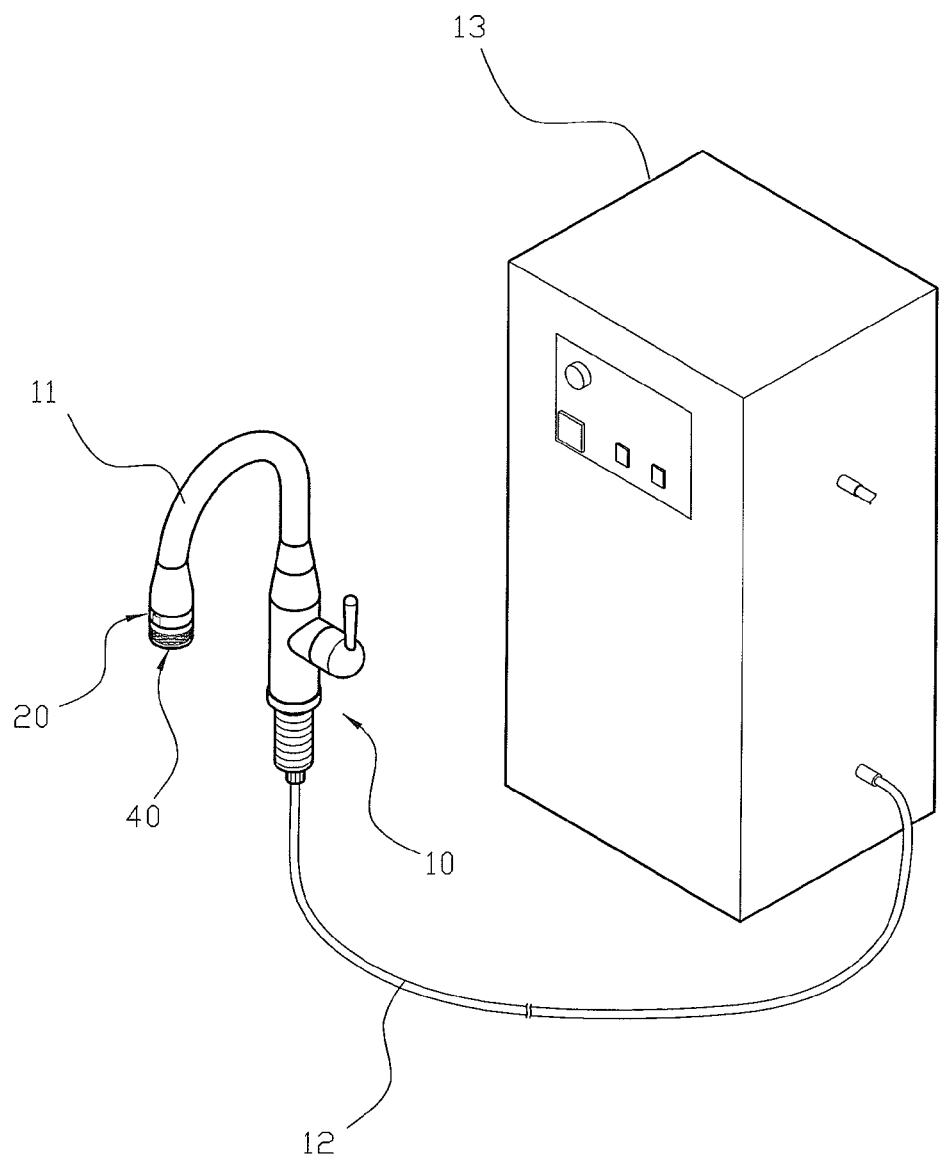
FIG. 3 is a perspective operational view of the ozone faucet switching structure as shown in FIG. 1.
Figure 4:
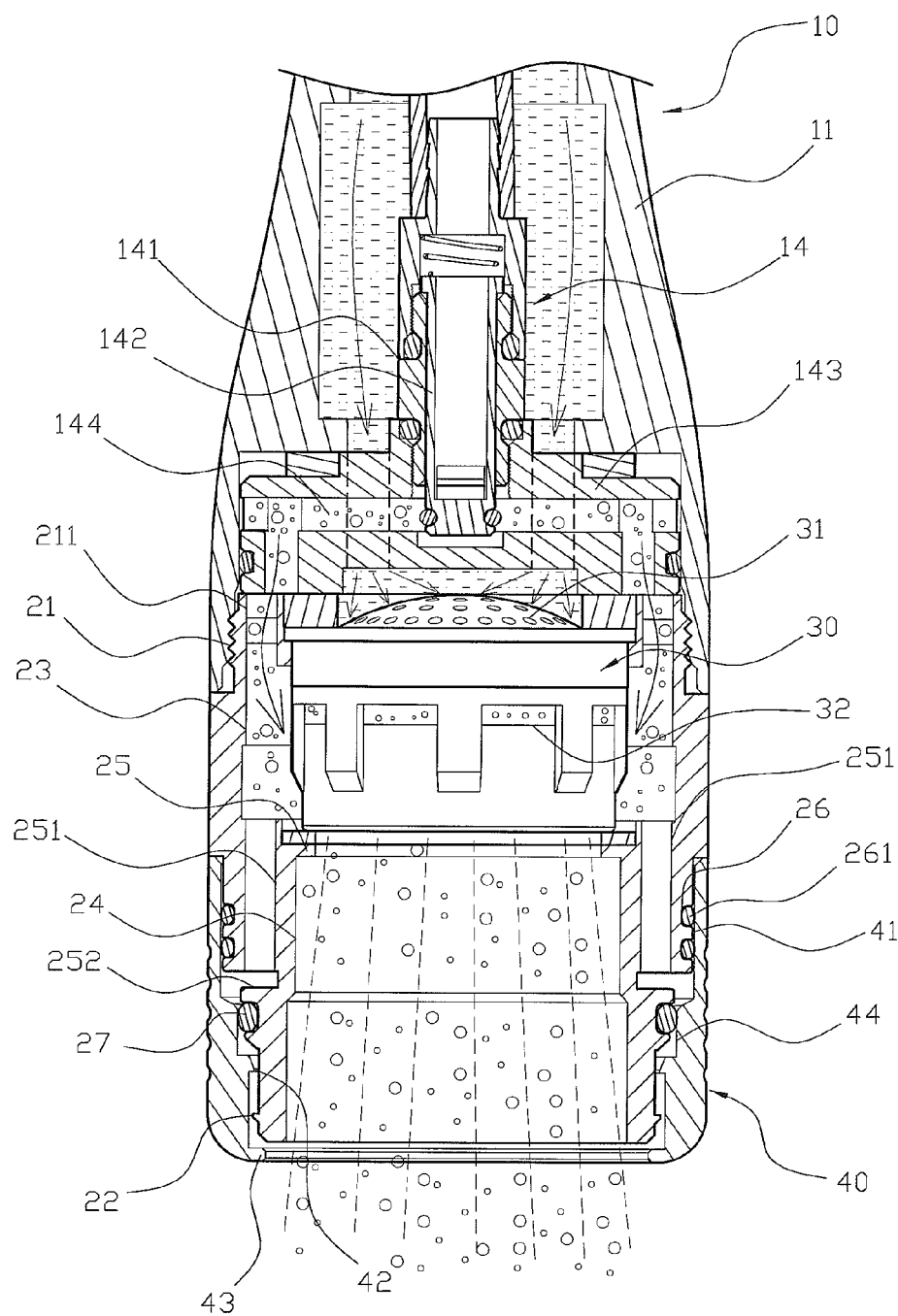
FIG. 4 is a front cross-sectional operational view of the ozone faucet switching structure as shown in FIG. 1.
Figure 5:
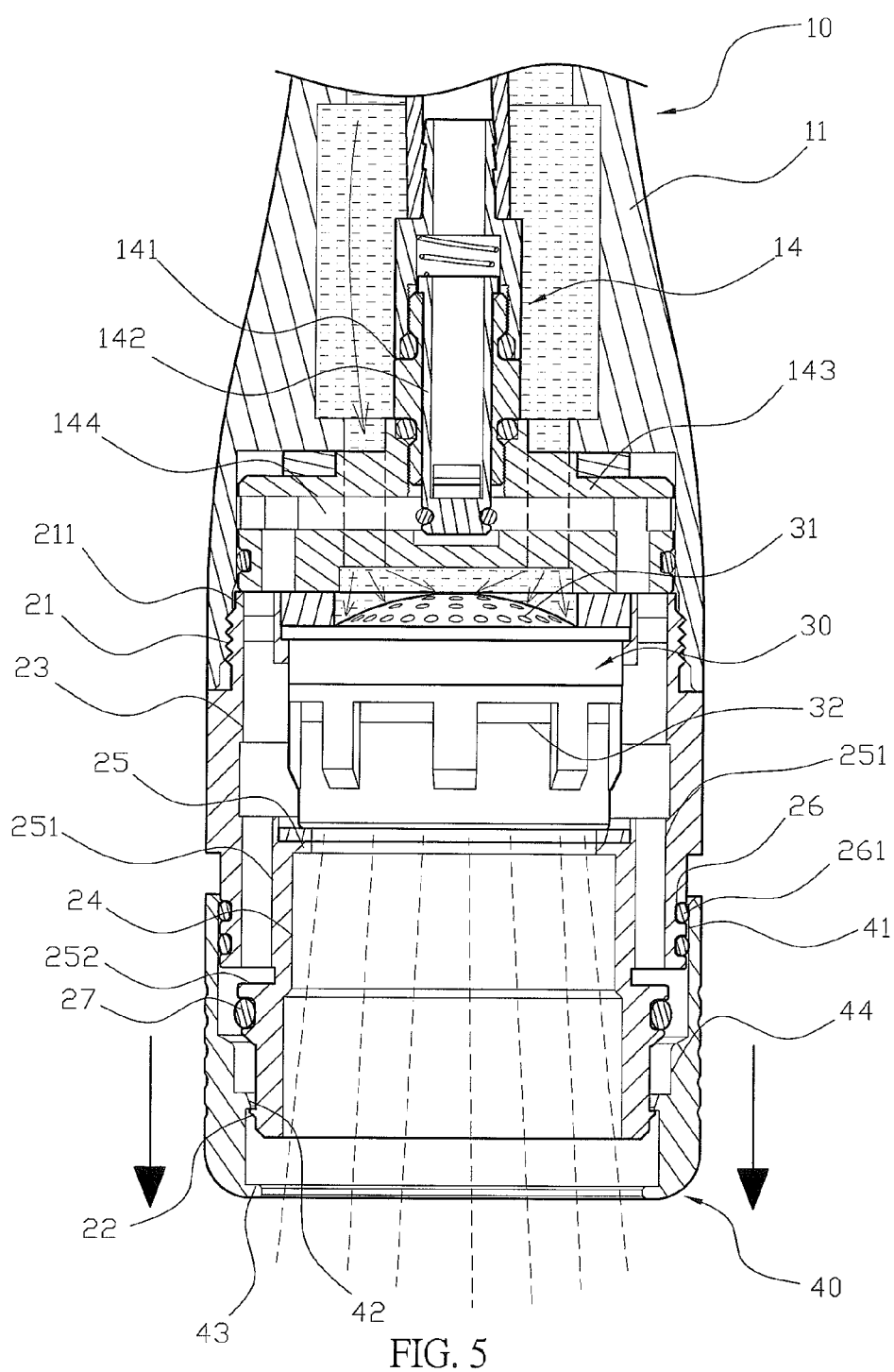
FIG. 5 is an operational view of the ozone faucet switching structure as shown in FIG. 4.
Figure 6:
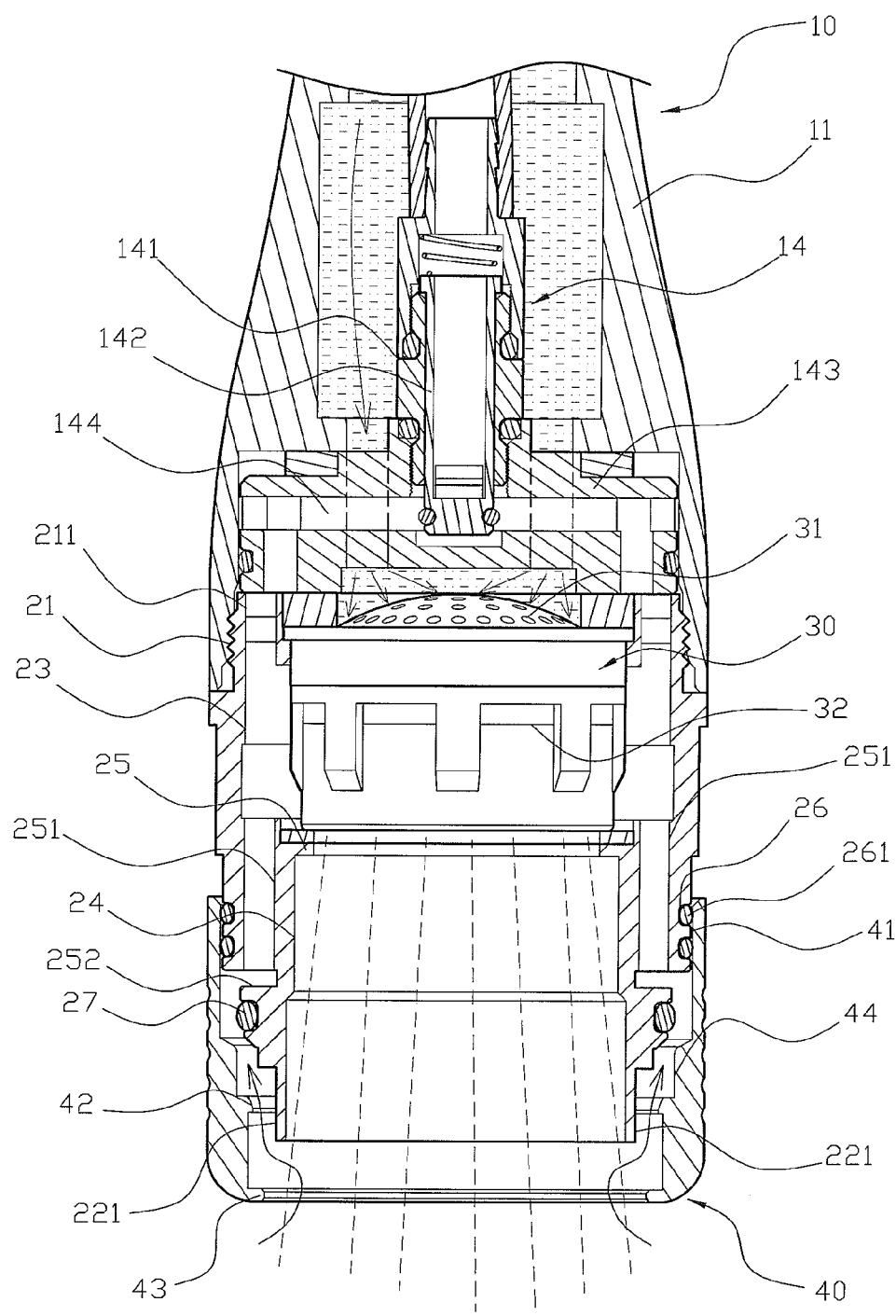
FIG. 6 is another front cross-sectional operational view of the ozone faucet switching structure as shown in FIG. 5.

In operation, referring to FIGS. 4-6 with reference to FIGS. 1-3, when the ozone from the ozone device 13 is used, the control sleeve 40 closes the air hole 252 of the connecting member 20, so that the upper channel 23 of the connecting member 20 is only connected to the lower channel 24. In such a manner, the water flow from the water outlet pipe 11 of the faucet body 10 passes through the aerating holes 31 into the aerator 30 and is dispersed by the aerating holes 31 of the aerator 30 so that the air is easily attached to the water flow. At this time, the water flow from the aerator 30 flows downward toward the lower channel 24 of the connecting member 20 by its inertia, thereby producing a siphoning effect in the side holes 32 of the aerator 30 to form a suction force by a negative pressure, so that the ozone is drawn by the negative pressure and is in turn introduced through the conduit 12 of the faucet body 10, the flow channel 144 of the check valve 14 and the connecting hole 211 of the connecting member 20 into the side holes 32 of the aerator 30 as shown in FIG. 4 so as to evenly mix with the water flow.

On the contrary, when the ozone from the ozone device 13 is not used, the control sleeve 40 is pulled and moved outward relative to the connecting member 20 to open the air hole 252 of the connecting member 20 as shown in FIG. 5, so that the air hole 252 and the pressure release hole 251 of the connecting member 20 are connected to the ambient environment to form an air connection. In such a manner, when the water flow passes through the aerator 30 to produce a siphoning effect in the side holes 32 of the aerator 30, the pressure release hole 251 of the connecting member 20 has an air pressure resistance smaller than that of the conduit 12 of the faucet body 10, so that the ozone will not be drawn the negative pressure and stops flowing outward. Therefore, the pressure release hole 251 of the connecting member 20 introduces the ambient air into the connecting member 20 as shown in FIG. 6 to stop flow of the ozone, thereby efficiently preventing the ozone from mixing with the drinking water. Thus, the control sleeve 40 is movable on the connecting member 20 to open/close the ozone.

In further illustration, again referring to FIGS. 1-6, the air hole 252 of the connecting member 20 is located between the elastic rings 261 and the stop ring 22, and the stop ring 22 of the connecting member 20 is provided with at least one air vent portion 221. In such a manner, when the ozone is not used, the control sleeve 40 is pulled and moved outward relative to the connecting member 20 to open the air hole 252 of the connecting member 20 as shown in FIG. 5, so that the ambient air is introduced through the air vent portion 221 of the stop ring 22 and flows between the connecting member 20 and the control sleeve 40 as shown in FIG. 6 into the pressure release hole 251 of the connecting member 20. Thus, the ambient air can replace the ozone to mix with the water flow. On the other hand, the seal ring 27 is located between the air hole 252 and the stop ring 22, and the inner pressing face 44 of the control sleeve 40 is located between the inner annular face 41 and the first annular flange 42. In such a manner, when the ozone from the ozone device 13 is used, the control sleeve 40 is pushed toward the connecting member 20, so that the inner pressing face 44 of the control sleeve 40 is moved to press the seal ring 27 so as to close the air hole 252 of the connecting member 20, thereby forming an air-tight effect between the connecting member 20 and the control sleeve 40. Thus, the ozone is drawn in a negative pressure manner to mix with the water flow.

Figure 7:
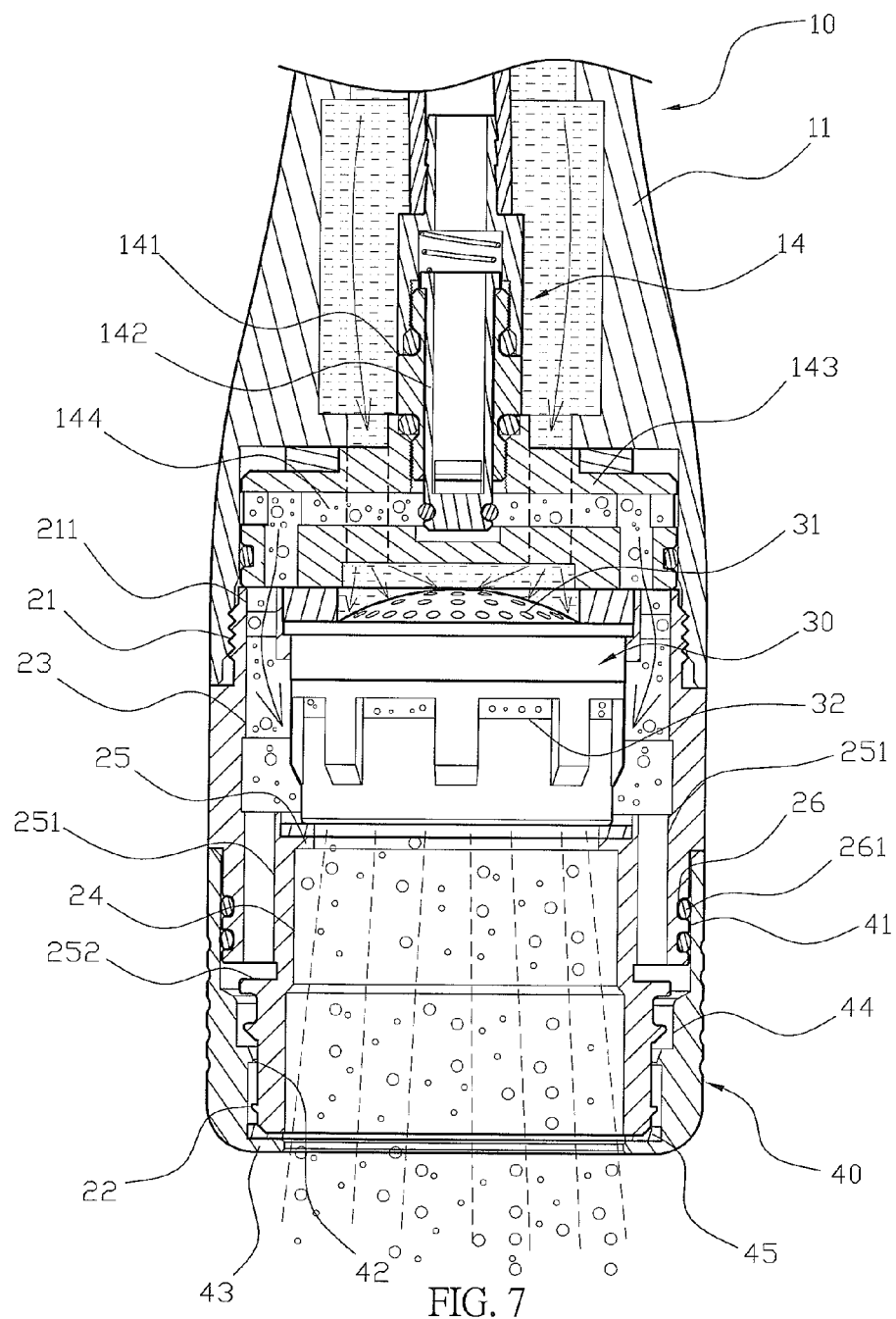
FIG. 7 is a front cross-sectional operational view of an ozone faucet switching structure in accordance with another preferred embodiment of the present invention.
Figure 8:
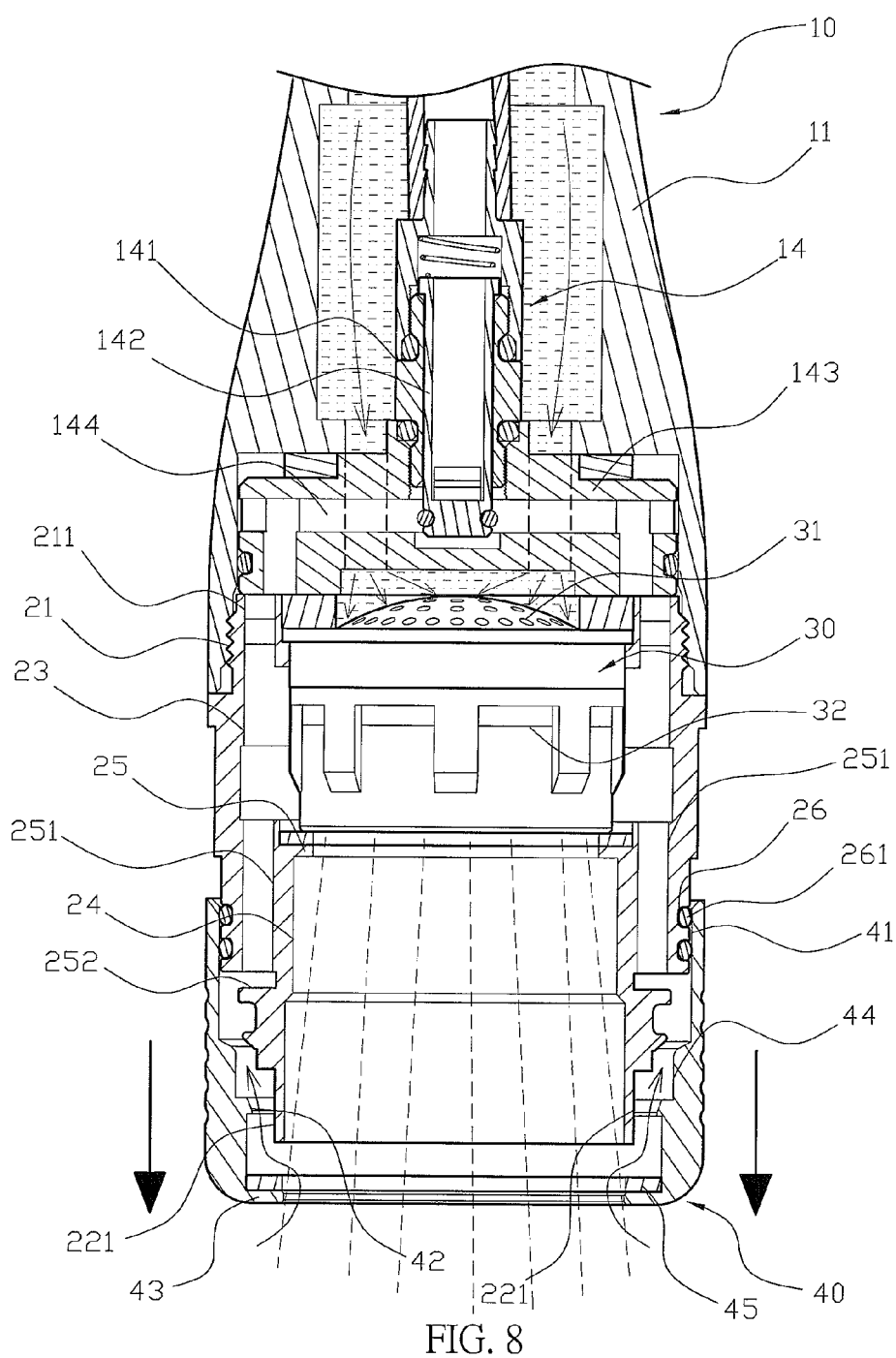
FIG. 8 is another front cross-sectional operational view of the ozone faucet switching structure as shown in FIG. 7.

Referring to FIGS. 7 and 8, the ozone faucet switching structure further comprises a gasket 45 mounted on the second annular flange 43 of the control sleeve 40. In such a manner, when the ozone is used, the control sleeve 40 is pushed toward the connecting member 20, so that the gasket 45 is moved to press the connecting member 20 so as to form an air-tight effect between the connecting member 20 and the control sleeve 40.

Figure 9:
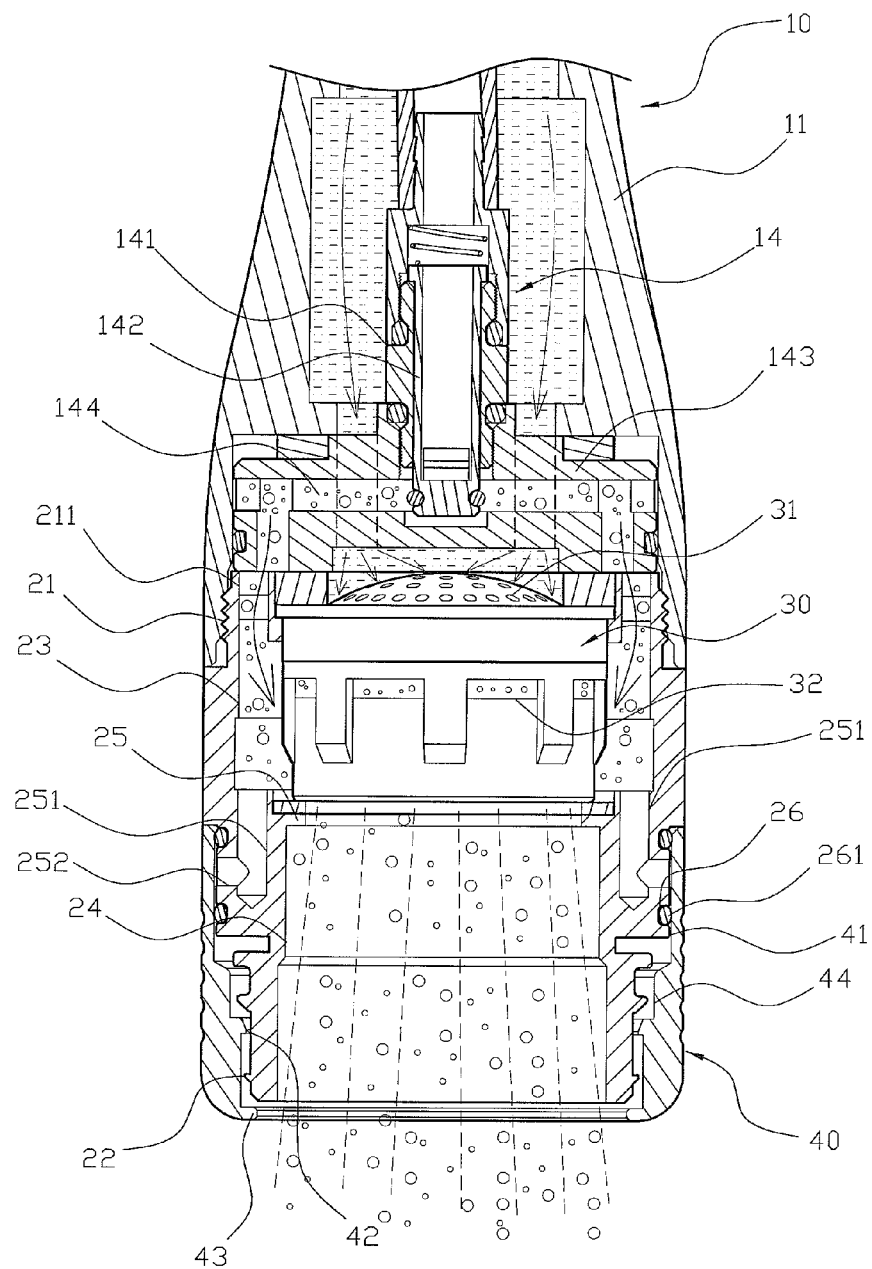
FIG. 9 is a front cross-sectional operational view of an ozone faucet switching structure in accordance with another preferred embodiment of the present invention.
Figure 10:
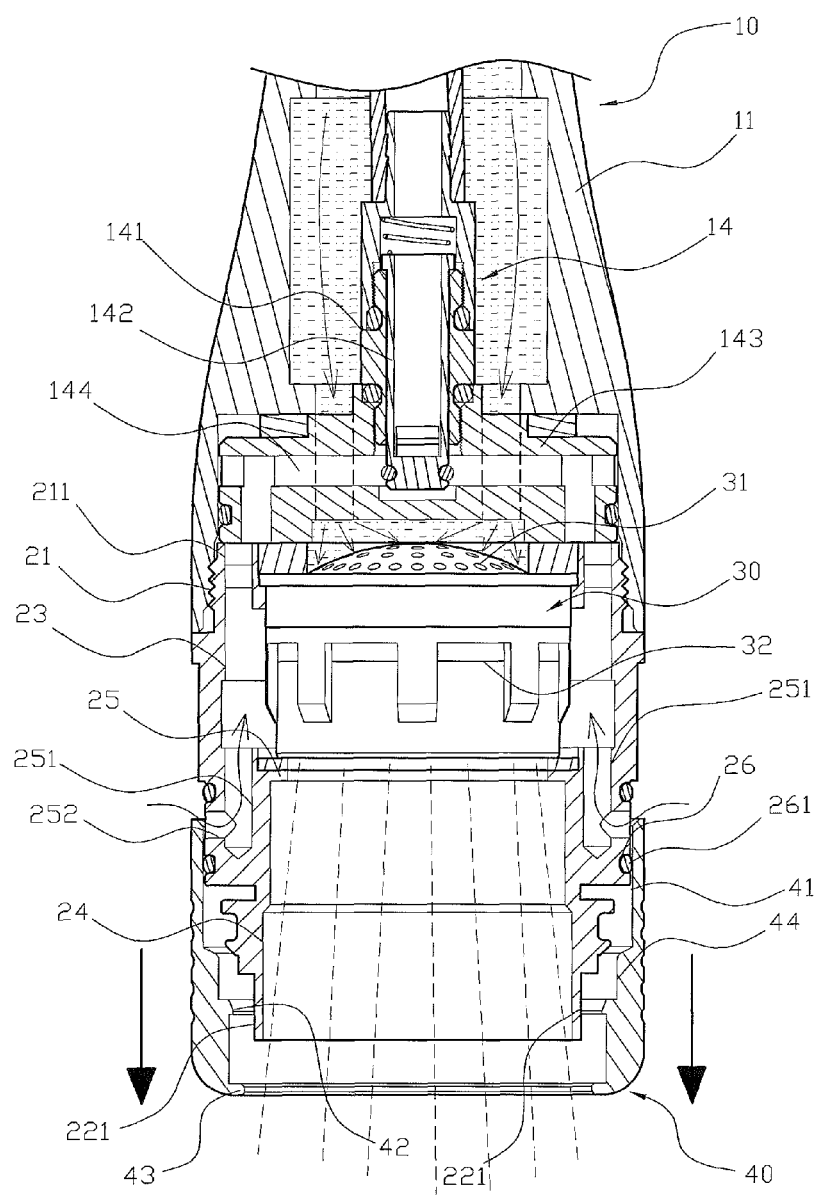
FIG. 10 is another front cross-sectional operational view of the ozone faucet switching structure as shown in FIG. 9.
Figure 11:
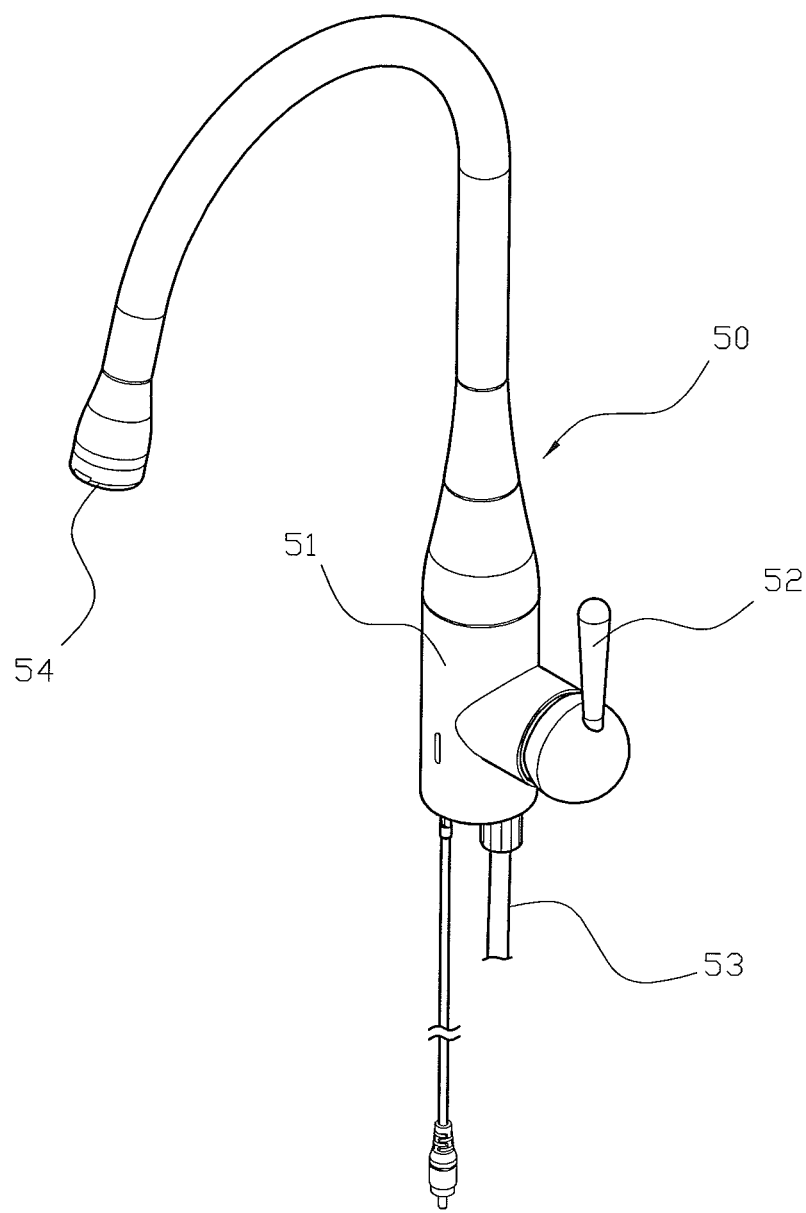
FIG. 11 is a perspective view of a conventional ozone faucet structure in accordance with the prior art.

Referring to FIGS. 9 and 10, the air hole 252 of the connecting member 20 is located between the elastic rings 261. In such a manner, when the ozone is used, the control sleeve 40 is pushed toward the connecting member 20, so that the inner annular face 41 of the control sleeve 40 is moved to press the elastic rings 261 so as to seal the air hole 252 of the connecting member 20 as shown in FIG. 9, thereby forming an air-tight effect between the connecting member 20 and the control sleeve 40. On the contrary, when the ozone is not used, the control sleeve 40 is pulled and moved outward relative to the connecting member 20, and the inner annular face 41 of the control sleeve 40 is moved to detach from one of the elastic rings 261 so as to open the air hole 252 of the connecting member 20 as shown in FIG. 10, so that the ambient air is introduced through the air hole 252 and the pressure release hole 251 into the upper channel 23 of the connecting member 20. Thus, the ambient air can replace the ozone to mix with the water flow.

Accordingly, the control sleeve 40 is movable on the connecting member 20 to stop supply of the ozone when not in use to prevent the ozone from being mixed with the drinking water so that the drinking water is used safely. In addition, the control sleeve 40 is moved relative to the connecting member 20 to switch supply of the ozone so that the user only needs to move the control sleeve 40 to open or close supply of the ozone, thereby facilitating the user operating the ozone faucet switching structure.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. An ozone faucet switching structure comprising:
   a faucet body;
   a connecting member connected with the faucet body;
   an aerator mounted in the connecting member; and
   a control sleeve mounted on the connecting member;
   wherein:
   the faucet body has a water outlet pipe which is provided with a conduit which is externally connected with a supply of ozone;
   the connecting member has a first end and a second end provided with a stop ring;
   the first end of the connecting member is connected to the water outlet pipe of the faucet body and has an inner edge provided with at least one connecting hole connected to the conduit of the faucet body;
   the connecting member is provided with an upper channel and a lower channel;
   the upper channel of the connecting member is connected to the at least one connecting hole;
   the connecting member is provided with an inwardly reduced ring located between the upper channel and the lower channel;
   the connecting member is provided with at least one pressure release hole which is located between the upper channel and the inwardly reduced ring;
   the connecting member has a periphery provided with an air hole connected to the pressure release hole;
   the connecting member has an outer surface provided with two annular grooves;
   the ozone faucet switching structure further comprises two elastic rings mounted in the annular grooves of the connecting member;
   the aerator is mounted in the upper channel of the connecting member and has a top provided with a plurality of aerating holes connected to the water outlet pipe of the faucet body;
   the aerator has a side face provided with a plurality of side holes which form a connection of the at least one connecting hole, the pressure release hole, the upper channel, the aerating holes and the lower channel;
   the control sleeve is provided with an inner annular face aligning with the annular grooves of the connecting member and pressing the elastic rings to form a movement resistance of the control sleeve; and
   the control sleeve is provided with a first annular flange and a second annular flange, with the stop ring of the connecting member being limited between the first annular flange and the second annular flange of the control sleeve.

2. The ozone faucet switching structure of claim 1, wherein:
   the air hole of the connecting member is located between the elastic rings and the stop ring;
   the stop ring of the connecting member is provided with at least one air vent portion which introduces an ambient air to flow between the connecting member and the control sleeve into the pressure release hole.

3. The ozone faucet switching structure of claim 2, wherein:
   the ozone faucet switching structure further comprises a seal ring mounted on the connecting member and located between the air hole and the stop ring;
   the control sleeve is provided with an inner pressing face pressing the seal ring; and the inner pressing face of the control sleeve is located between the inner annular face and the first annular flange.

4. The ozone faucet switching structure of claim 2, further comprising:
a gasket mounted on the second annular flange of the control sleeve and pressing the connecting member.

5. The ozone faucet switching structure of claim 1, wherein:
the air hole of the connecting member is located between the elastic rings; and
the inner annular face of the control sleeve presses the elastic rings.

6. The ozone faucet switching structure of claim 1, further comprising:
a check valve mounted between the conduit of the faucet body and the at least one connecting hole of the connecting member to form a oneway flow from the conduit of the faucet body to the connecting member.

7. The ozone faucet switching structure of claim 6, wherein:
the check valve includes a valve tube, a valve seat connected with the valve tube, and a valve core movably mounted in the valve tube;
the valve tube of the check valve has a first end connected to the conduit of the faucet body and a second end connected to the valve seat;
the valve seat of the check valve has an interior provided with a flow channel connected to the valve tube and the at least one connecting hole of the connecting member; and
the valve core of the check valve forms a oneway block to the flow channel of the valve seat.

* * * * *